(12) United States Patent
Brandt et al.

(10) Patent No.: US 7,708,190 B2
(45) Date of Patent: May 4, 2010

(54) MULTIPLE OPTIONS TO DECLINE AUTHORIZATION OF PAYMENT CARD CHARGES

(75) Inventors: Jeffrey Lewis Brandt, Cedar Park, TX (US); James Thomas Miller, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 73 days.

(21) Appl. No.: 10/797,919

(22) Filed: Mar. 10, 2004

(65) Prior Publication Data

US 2005/0199714 A1    Sep. 15, 2005

(51) Int. Cl.
*G06Q 40/00* (2006.01)
*G06K 5/00* (2006.01)

(52) U.S. Cl. ........................................ 235/379; 705/44
(58) Field of Classification Search ................. 235/375, 235/379–383; 705/16, 17, 18, 44, 35, 39, 705/43
See application file for complete search history.

(56) References Cited

U.S. PATENT DOCUMENTS

| | | | | |
|---|---|---|---|---|
| 4,114,027 A | * | 9/1978 | Slater et al. .................... | 705/43 |
| 5,530,438 A | * | 6/1996 | Bickham et al. .............. | 340/5.8 |
| 5,819,226 A | * | 10/1998 | Gopinathan et al. ........... | 705/44 |
| 5,878,403 A | * | 3/1999 | DeFrancesco et al. ......... | 705/38 |
| 5,892,824 A | | 4/1999 | Beatson et al. | |
| 5,999,596 A | * | 12/1999 | Walker et al. ............. | 379/91.01 |
| 6,047,270 A | * | 4/2000 | Joao et al. ...................... | 705/44 |
| 6,052,675 A | * | 4/2000 | Checchio ...................... | 705/44 |
| 6,327,348 B1 | | 12/2001 | Walker et al. | |
| 6,422,462 B1 | * | 7/2002 | Cohen ......................... | 235/381 |
| 6,597,770 B2 | | 7/2003 | Walker et al. | |
| 6,678,666 B1 | | 1/2004 | Boulware | |
| 2002/0116329 A1 | * | 8/2002 | Serbetcioglu et al. ......... | 705/39 |
| 2003/0014367 A1 | * | 1/2003 | Tubinis ....................... | 705/64 |
| 2003/0069802 A1 | * | 4/2003 | Ramsey-Catan ............. | 705/26 |
| 2003/0144952 A1 | * | 7/2003 | Brown et al. .................. | 705/40 |
| 2003/0182214 A1 | * | 9/2003 | Taylor ......................... | 705/35 |
| 2004/0254868 A1 | * | 12/2004 | Kirkland et al. ............... | 705/35 |

* cited by examiner

*Primary Examiner*—Jamara A Franklin
(74) *Attorney, Agent, or Firm*—Toler Law Group

(57) ABSTRACT

A payment card transaction notification and authorization system provides a notification message to a payment card holder of an attempted transaction using his/her payment card. The system provides multiple options for the payment card holder to decline authorization of the attempted transaction. The multiple options comprise a first option for the payment card holder to decline authorization of an undesirable but non-fraudulent transaction, and a second option for the payment card holder to decline authorization of a fraudulent transaction.

30 Claims, 3 Drawing Sheets

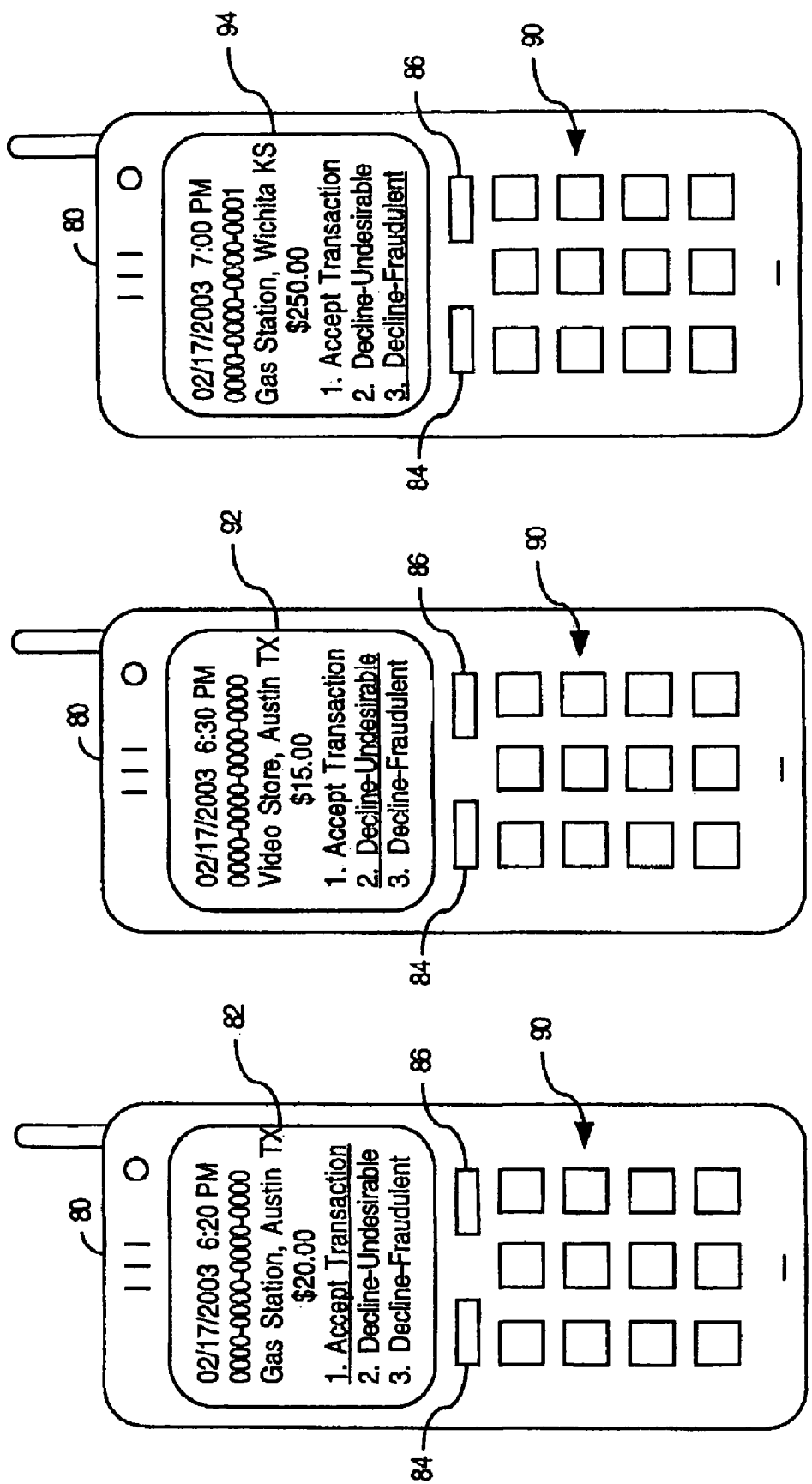

US 7,708,190 B2

MULTIPLE OPTIONS TO DECLINE AUTHORIZATION OF PAYMENT CARD CHARGES

FIELD OF THE INVENTION

The present disclosure relates to methods and systems for authorizing charges using a payment card such as a credit card, a debit card, or a calling card.

BACKGROUND

Fraudulent payment card charges are a concern for many consumers. The fear of fraud inhibits many consumers from making electronic commerce transactions, e.g. via the Internet. One factor that contributes to the fear is the delay between a fraudulent transaction and the receipt of a bill. Because of the delay, fraudulent transactions can go unchecked for up to a month.

BRIEF DESCRIPTION OF THE DRAWINGS

The present invention is pointed out with particularity in the appended claims. However, other features are described in the following detailed description in conjunction with the accompanying drawings in which:

FIG. 3 illustrates an example of a communication device displaying a first attempted transaction notification message;

FIG. 4 illustrates an example of the communication device displaying a second attempted transaction notification message; and FIG. 5 illustrates an example of the communication device displaying a third attempted transaction notification message.

DETAILED DESCRIPTION OF THE DRAWINGS

Embodiments of the present invention make a card holder aware of payment card transactions in real-time or near-real-time, and provide the card holder with multiple options to decline authorization for undesirable transactions. The multiple decline options may include a first decline option that simply declines authorization of a transaction (e.g. if the card holder's son or daughter is attempting to make a transaction that is undesirable to the card holder), and a second decline option that declines authorization of a transaction and indicates that the transaction may be fraudulent (e.g. if someone is attempting to make a fraudulent transaction with a stolen payment card or stolen payment card number).

Figure 1:
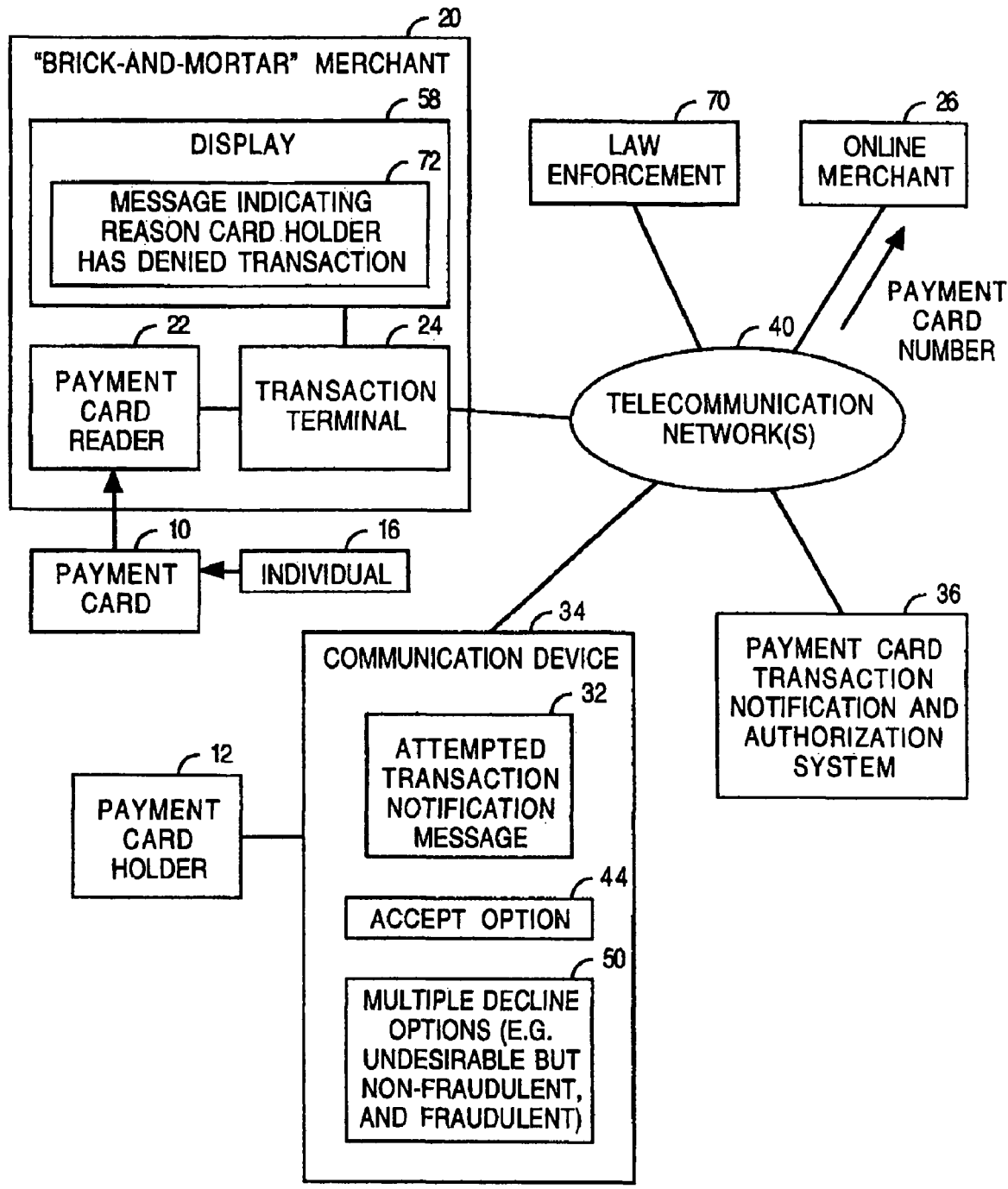
FIG. 1 is a block diagram of an embodiment of a system to authorize and decline payment card charges in real-time or near-real-time.
Figure 2:
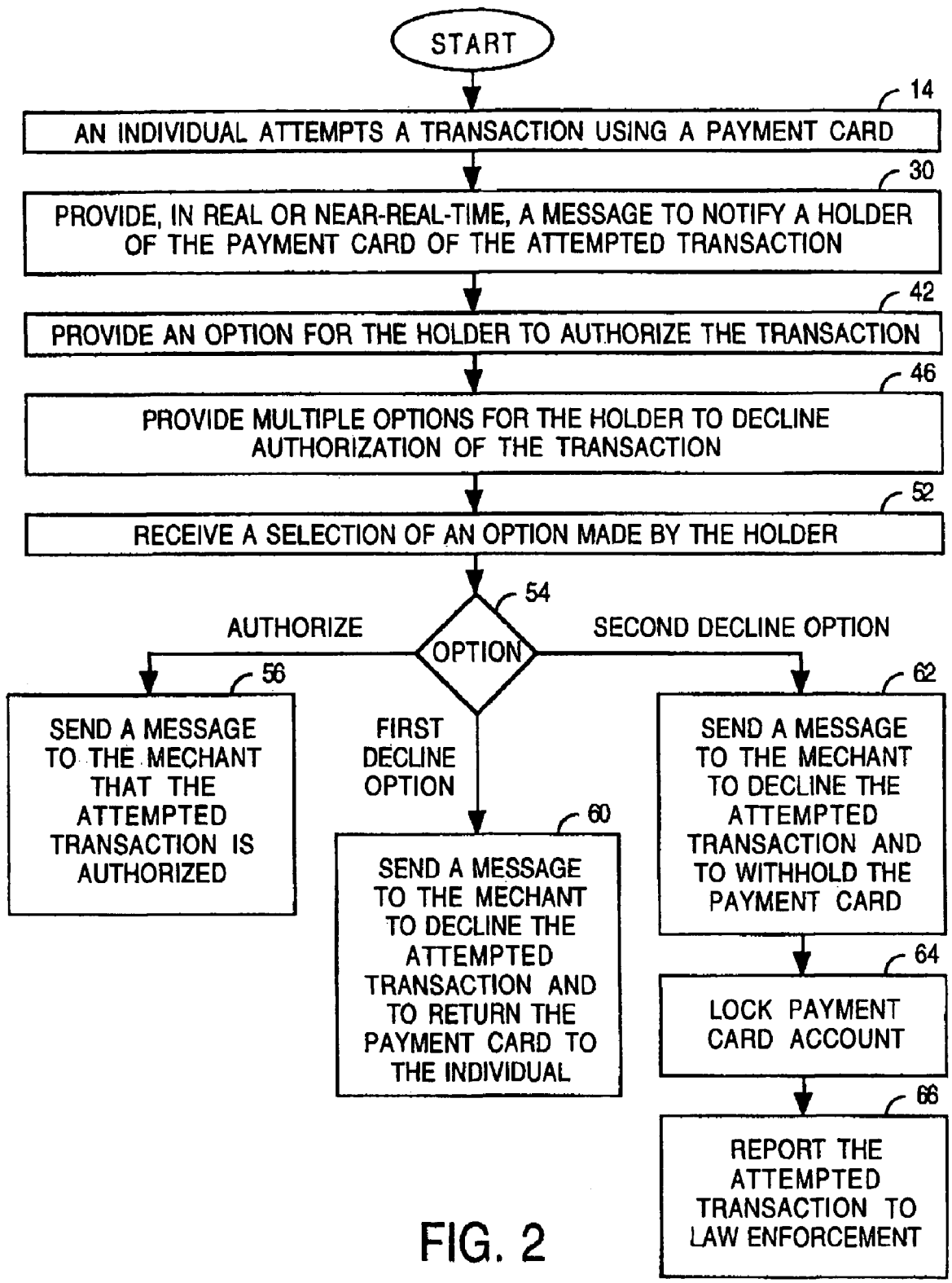
FIG. 2 is a flow chart of an embodiment of a method of authorizing and declining payment card charges in real-time or near-real-time.

Embodiments of the present invention are described with reference to FIG. 1, which is a block diagram of an embodiment of a system to authorize and decline payment card charges in real-time or near-real-time, and FIG. 2, which is a flow chart of an embodiment of a method of authorizing and declining payment card charges in real-time or near-real-time. The charges are associated with a payment card 10 that belongs to a payment card holder 12. Examples of the payment card 10 include, but are not limited to, a credit card, a debit card, a telephone calling card, or any account that allows charges against it regardless of the existence of a physical token or card.

As indicated by block 14, the method comprises an individual 16 attempting a transaction using the payment card 10. The individual 16 may comprise the payment card holder 12, someone authorized by the payment card holder 12 to pay for one or more transaction using the payment card 10, or someone unauthorized by the payment card holder 12 to make any transaction using the payment card 10. An example of an authorized individual is the holder's 12 son or daughter. An example of an unauthorized individual is someone who stole the payment card 10 or is otherwise fraudulently using an account number of the payment card 10.

The transaction may be attempted at a "brick-and-mortar" merchant 20 such as a retailer having a physical presence for customers. Typically, the payment card 10 is read by a payment card reader 22 coupled to a transaction terminal 24 at the brick-and-mortar merchant 20. For example, the payment card reader 22 may comprise a magnetic stripe reader to read a magnetic stripe on a credit card or a debit card. Alternatively, the transaction may be attempted using an online merchant 26, wherein an account number of the payment card 10 is communicated to the online merchant 26 to attempt the transaction. As another alternative, the transaction may be attempted over a telephone call. For example, the transaction may involve the individual 16 saying the account number of the payment card 10 to the merchant over the phone.

As indicated by block 30, the method comprises providing a notification message 32 to the payment card holder 12 of the attempted transaction using his/her payment card 10. The notification message 32 is provided to a communication device 34 of the holder 12 in either real-time or near-real-time by a payment card transaction notification and authorization system 36 in communication with the transaction terminal 24. Examples of the communication device 34 include, but are not limited to, a personal computer, a wireless telephone, a landline telephone, a wireless pager (e.g. numeric, alphanumeric, and/or two-way), a wireless personal digital assistant (PDA), and a fax machine. The notification message 32 may have various forms. Examples of forms of the notification message 32 include, but are not limited to, an instant message, an e-mail message, a posting to a Web site, a chat message, a telephone call, a voice mail message, a short messaging service (SMS) message, a paging message, and a fax message.

The payment card transaction notification and authorization system 36 communicates with the communication device 34 and the transaction terminal 24 via one or more telecommunication networks 40. Examples of the one or more telecommunication networks 40 include, but are not limited to, a landline telephone system, a wireless telephone system, a satellite telecommunication system, a digital subscriber line network, and the Internet.

The notification message 32 indicates any combination of date and time of the attempted transaction, all or part of a number of the payment card 10 (e.g. the part being the last four digits of the number), a name of the merchant 20, an identifier of the merchant 20, a location of the merchant 20 (e.g. address, city, state and postal code), a register number to identify the transaction terminal 24, and an amount (e.g. in dollars) of the attempted transaction. The notification message 32 is displayed by a display of the communication device 34 so that the payment card holder 12 can review any of the aforementioned information. The display can be visual, audible, or a combination of both.

The transaction notification and authorization system 36 can be controlled by the issuer of the payment card 10. In one embodiment, the transaction notification and authorization system 36 also performs conventional acts of receiving authorization requests from retailers that swipe its payment cards, and providing authorization numbers back to retailers in response thereto. The platform that processes these authorization requests can be adapted or tied to another platform to perform the acts described herein (e.g. formatting and sending a notification message according to a stored profile of the payment card holder 12).

As indicated by block 42, the method comprises providing an option 44 for the holder 12 to accept/authorize the attempted transaction. As indicated by block 46, the method comprises providing multiple options 50 for the holder 12 to decline authorization of the attempted transaction. In one embodiment, the multiple options 50 comprise a first decline option and a second decline option. The first decline option enables the payment card holder 12 to decline authorization of an undesirable, but non-fraudulent transaction. The second decline option enables the payment card holder 12 to decline authorization of a fraudulent transaction. Other decline options may be provided in alternative embodiments.

A specific example of an undesirable, but non-fraudulent transaction attempt is if the payment card holder's 12 son/daughter attempts to rent a video with the payment card 10 when he/she is only allowed to use the payment card 10 to buy gasoline and pick up the dry cleaning. Another specific example of an undesirable, but non-fraudulent transaction attempt is if an employee uses a corporate credit card at an undesirable merchant. For example, if an employee is traveling on company matters, he/she is authorized to use the corporate credit card to pay for a hotel rack rate, but is unauthorized to use the corporate credit card to buy liquor or to rent a movie.

As indicated by block 52, the method comprises receiving a selection made by the payment card holder 12 using the communication device 34 of one of the options. The selection is received by the payment card transaction notification and authorization system 36 via the one or more telecommunication networks 40. The selection can be made using a variety of input devices of the communication device. Examples of the input device include, but are not limited to, a pointing device such as a mouse, pointing stick, touchpad or trackball; a voice input device such as a microphone; an alphanumeric keyboard; telephone dialing keys; soft buttons or other keys on a wireless telephone; and a touchscreen.

As indicated by block 54, different acts are performed based on the selection. If the authorize option 44 is selected by the holder 12, an act of sending a message to the merchant 20 is performed as indicated by block 56. The message indicates that the attempted transaction has been authorized by the holder 12. The message is sent to the transaction terminal 24 via the one or more telecommunication networks 40. The message can be displayed by a display 58 coupled to the transaction terminal 24.

If the first decline option is selected by the holder 12, an act of sending a first decline message to the merchant 20 is performed as indicated by block 60. The first decline message indicates that the attempted transaction is to be declined, and that the merchant 20 is to return the payment card to the individual 16. The message is sent to the transaction terminal 24 via the one or more telecommunication networks 40, and displayed by the display 58.

If the second decline option is selected by the holder 12, an act of sending a second decline message to the merchant 20 is performed as indicated by block 62. The second decline message indicates that the attempted transaction is to be declined, and that the merchant is to withhold returning the payment card to the individual 16. The message is sent to the transaction terminal 24 via the one or more telecommunication networks 40, and displayed by the display 58. Other acts 64 and 66 that may be performed based on the selection of the second decline option are locking an account associated with the payment card 10, and automatically reporting the fraudulent transaction to a law enforcement authority 66. Optionally, the fraudulent transaction can be reported to one or more other contacts either in addition to or as an alternative to the law enforcement authority. The other contacts may be one or more credit reporting agencies.

Optionally, for a selection of any decline option, the holder 12 may enter or select a reason code using the communication device 34 to indicate why the attempted transaction has been declined. The payment card transaction notification and authorization system 36 forwards the reason code to the transaction terminal 24 so that a message 72 indicating same is shown on the display 58.

FIGS. 3 to 5 illustrate examples of a communication device 80 displaying attempted transaction notification messages. In these examples, the communication device 80 comprises a wireless telephone of the payment card holder 12.

Consider the payment card holder 12 giving his payment card 10 to his son to buy gasoline and to pick up dry cleaning. FIG. 3 illustrates a first attempted transaction notification message 82 displayed by the communication device 80 when the son attempts to buy gasoline using the payment card 10. The message 82 indicates a date and time of the attempted transaction, the account number of the payment card 10, the name of the merchant being "Gas Station", the location of the merchant being in Austin, Tex., and the transaction amount being $20. The holder 12 is provided three options: accept, decline-undesirable, and decline-fraudulent. Each of the options can be selected using soft keys 84 or 86, or telephone dialing keys 90. Consider the holder 12 selecting the accept option. The transaction is authorized and completed.

FIG. 4 illustrates a second attempted transaction notification message 92 displayed by the communication device 80 when the son attempts to buy a DVD using the payment card 10. The message 92 indicates a date and time of the attempted transaction, the account number of the payment card 10, the name of the merchant being "Video Store", the location of the merchant being in Austin, Tex., and the transaction amount being $15. Since the son was to use the payment card 10 only for gasoline and dry cleaning, the holder 12 selects the decline-undesirable option. Thus, the attempted transaction using the payment card 10 is not completed. The son could complete the attempted transaction by paying cash, for example.

FIG. 5 illustrates a third attempted transaction notification message 94 displayed by the communication device 80. The message 94 indicates a date and time of an attempted transaction, an account number of a different payment card of the holder 12, the name of the merchant being "Gas Station", the location of the merchant being in Wichita, Kans., and the transaction amount being $250. Based on the message 94, the holder 12 checks his wallet and discovers that this payment card is missing. The holder 12, assuming that the payment card has been stolen, selects the decline-fraudulent option. In response thereto, the attempted transaction using the payment card is not completed, the payment card is withheld by the gas station in Wichita, the account of the payment card is locked by the issuer, and law enforcement is contacted.

Two more examples of using embodiments of the present invention are as follows. The payment card holder 12 uses her debit card 10 to pay for groceries. The cashier totals her purchase using the transaction terminal 24 and swipes her debit card 10 using the card reader 22. While the groceries are being bagged, a two-way pager or wireless phone of the holder 12 vibrates to alert of an incoming message from the card issuer. The message reads "authorize $43.27 at Grocery Store? YES? NO-UNDESIRABLE? or NO-FRAUDULENT?" The holder 12 selects "YES". The card issuer returns an authorization code to the transaction terminal 24 and the cashier hands a receipt to the holder 12.

A thief picks up the holder's 12 purse/wallet including her credit card, that she left at the grocery store, and heads to a consumer electronics store. The thief attempts to buy a top-of-the-line 55-inch plasma television using the credit card. The clerk swipes the credit card and calls for a stocker to bring up the television. The holder's 12 wireless telephone rings and a voice asks "will you authorize a purchase of a $9,875 at the Electronics Store on West Main Street? Please say 'yes', 'no', or 'no and lock my account.'" The holder 12 replies by saying "no and lock my account". The card issuer locks the account, declines to authorize the purchase, and notifies the clerk that fraud is in progress. The clerk calls for security. The holder 12 calls the local police. Everyone meets at the consumer electronics store.

Real-time and near-real-time notification of card transactions make a card holder immediately or nearly immediately (e.g. in the same day) aware of fraudulent or undesirable usage. This allows the card holder to promptly report fraud to the card issuer, limiting the charges and preventing further charges.

Optionally, the transaction notification and authorization system 36 can send notification messages to multiple parties. For example, a business with a company credit card may want notification messages sent to the card holder and to a finance/budget clerk.

As another option, the transaction notification and authorization system 36 can apply threshold-based rules for notification to the payment card holder 12. Examples of the rules include, but are not limited to: notify if a purchase amount exceeds a threshold (e.g. in dollars); notify by a type of merchant (e.g. for food, gas, retail, Internet); notify if usage exceeds a threshold in a time period (e.g. this is the fifth purchase today); notify if usage occurs in a time window (e.g. between 11:00 PM and 5:00 AM); and notify if the credit limit will be exceeded by the attempted transaction.

In one embodiment using a threshold rule, the payment card holder 12 can use the communication device 34 to send a message, such as an SMS message, to the payment card transaction and notification system 36 to pre-approve a large expenditure amount over a threshold he/she had set. For instance, the payment card holder 12 may have a $100 limit on all purchases, but pre-approves a $10,000 limit for the purchase of a plasma-screen television. In this way, the payment card transaction notification and authorization system 36 acts to increase a purchase limit threshold for the payment card 10 based on a message received from the payment card holder 12.

The description provided herein focuses on a single payment card for a single card holder. However, it should be apparent that the transaction notification and authorization system 36 is to be used for multiple payment cards issued to multiple card holders.

The transaction notification and authorization system 36 can be embodied by a computer system. Computer-readable program code stored by a computer-readable medium causes the computer system to perform acts described herein. Examples of the computer-readable medium include, but are not limited to, an electronic medium such as an electronic memory, a magnetic medium such as a hard disk or a floppy disk, and an optical medium such as an optical disk.

It will be apparent to those skilled in the art that the disclosed embodiments may be modified in numerous ways and may assume many embodiments other than the particular forms specifically set out and described herein. For example, some acts shown in FIG. 2 may be performed in an alternative order or in parallel. For example, the acts indicated by blocks 62, 64 and 66 may be performed in an alternative order or in parallel.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method performed by a payment card processor, comprising:
    sending a first notification message to a first device associated with a payment card holder of a payment card and a second notification message to a second device associated with a second party other than the payment card holder when a purchase amount of an attempted transaction exceeds a maximum purchase threshold, wherein the second party is affiliated with a business associated with the payment card; and
    processing the attempted transaction without sending the first notification message and the second notification message when the purchase amount of the attempted transaction does not exceed the maximum purchase threshold;
    wherein the first notification message and the second notification message each include a plurality of options to decline authorization of the attempted transaction.

2. The method of claim 1, wherein the plurality of options comprise a first option to decline authorization of an undesirable but non-fraudulent transaction, and a second option to decline authorization of a fraudulent transaction.

3. The method of claim 2, further comprising:
    receiving a selection of the first option; and
    based on the selection, providing a message to a merchant involved in the attempted transaction to decline the attempted transaction and to return the payment card to an individual attempting the transaction.

4. The method of claim 2, further comprising:
    receiving a selection of the second option; and
    based on the selection, providing a message to a merchant involved in the attempted transaction to decline the attempted transaction and to withhold the payment card from an individual attempting the transaction.

5. The method of claim 2, further comprising:
    receiving a selection of the second option; and
    based on the selection, locking an account associated with the payment card.

6. The method of claim 2, further comprising:
    receiving a selection of the second option; and
    based on the selection, automatically reporting the fraudulent transaction to a law enforcement authority.

7. The method of claim 2, further comprising:
    receiving a selection of the second option; and
    based on the selection, automatically reporting the fraudulent transaction to a credit reporting agency.

8. The method of claim 1, further comprising:
    receiving a message to pre-approve a particular payment card transaction above the maximum threshold transaction based on a threshold rule and processing the particular transaction without sending the first notification message and the second notification message.

9. The method of claim 1, further comprising sending the first notification message and the second notification message when a second attempted transaction occurs that does not exceed the maximum purchase threshold but does exceed a threshold number of uses of the payment card in a particular time period.

10. The method of claim 1, further comprising sending the first notification message and the second notification message when a second attempted transaction occurs that does not exceed the maximum purchase threshold but does occur in a particular time window.

11. The method of claim 1, wherein the attempted transaction is processed without sending the first notification message and the second notification message when the attempted transaction is at a payment card holder approved type of merchant.

12. The method of claim 1, wherein the first notification message and the second notification are sent when the attempted transaction exceeds a payment card holder usage threshold.

13. The method of claim 1, wherein the attempted transaction is processed without sending the first notification message and the second notification message when the attempted transaction occurs during a payment card holder time window threshold.

14. The method of claim 1, wherein the first notification message and the second notification message are sent when the attempted transaction exceeds a payment card holder credit limit threshold.

15. A system comprising:
a payment card transaction notification and authorization system that uses a telecommunication network to:
send a notification message from a payment card processor to a device associated with a payment card holder of an attempted transaction using a payment card when a purchase amount of the attempted transaction exceeds a maximum purchase threshold;
provide a first option for the payment card holder to decline authorization of the attempted transaction upon receiving the notification message for a non-fraudulent transaction;
provide a second option for the payment card holder to decline authorization of the attempted transaction upon receiving the notification message for a fraudulent transaction;
decline authorization and send a message to a merchant involved in the attempted transaction to return the payment card to an individual making the attempted transaction in response to receiving information indicating an input on the device selecting the first option;
decline authorization and send a message to the merchant involved in the attempted transaction to withhold the payment card from the individual making the attempted transaction in response to receiving information indicating the input on the device selecting the second option; and
process the attempted transaction without sending the notification message to the device when the attempted transaction does not exceed the maximum purchase threshold.

16. The system of claim 15, wherein the payment card transaction notification and authorization system uses the telecommunications network to send a second notification when the purchase amount of the attempted transaction does not exceed the maximum purchase threshold but the attempted transaction exceeds a threshold number of uses of the payment card in a particular time period.

17. The system of claim 16, wherein the payment card transaction notification and authorization system uses the telecommunications network to send a second notification when the purchase amount of the attempted transaction does not exceed the maximum purchase threshold but the attempted transaction occurs in a particular time window.

18. The system of claim 16, wherein the payment card transaction notification and authorization system uses the telecommunications network to send a second notification when the purchase amount of the attempted transaction does not exceed the maximum purchase threshold but the attempted transaction would cause a credit limit of the payment card to be exceeded.

19. The system of claim 16, wherein the payment card transaction notification and authorization system is further configured to automatically report the fraudulent transaction to a law enforcement authority in response to receiving information indicating an input selecting the second option by the payment card holder.

20. The system of claim 16, wherein the payment card transaction notification and authorization system is further configured to automatically report the fraudulent transaction to a credit reporting agency in response to receiving information indicating an input selecting the second option by the payment card holder.

21. The system claim 15, wherein the payment card transaction notification and authorization system uses the telecommunications network to have an account associated with the payment card locked in response to receiving information indicating an input selecting the second option by the payment card holder.

22. The system of claim 15, wherein the payment card transaction notification and authorization system is further configured to send a reason code to a merchant involved in the attempted transaction to indicate why the attempted transaction has been declined in response to receiving information indicating selection of the first option or the second option by the payment card holder.

23. The system of claim 15, wherein the payment card transaction notification and authorization system is further configured to provide an option for the payment card holder to authorize the attempted transaction.

24. The system of claim 15, wherein the notification message indicates a transaction amount, a merchant name, and at least part of a number of the payment card.

25. The system of claim 15, wherein the payment card transaction notification and authorization system is further configured to increase a purchase limit threshold for the payment card based on a short message service (SMS) message received from the payment card holder.

26. The system of claim 15, wherein the attempted transaction is processed without sending the notification message when the attempted transaction is at a payment card holder approved type of merchant.

27. The system of claim 15, wherein the notification message is sent when the attempted transaction exceeds a payment card holder usage threshold.

28. The system of claim 15, wherein the attempted transaction is processed without sending the notification message when the attempted transaction occurs during a payment card holder time window threshold.

29. The system of claim 15, wherein the notification message is sent when the attempted transaction exceeds a payment card holder credit limit threshold.

30. A method comprising:

sending a notification message from a payment card processor to a device associated with a payment card holder of an attempted transaction using a payment card when a purchase amount of the attempted transaction exceeds a maximum purchase threshold, the notification message indicating a transaction amount, a merchant name, and at least part of a number of the payment card, and processing the attempted transaction without sending the notification message to the device when the attempted transaction does not exceed the maximum purchase threshold;

providing an option for the payment card holder to authorize the transaction;

providing multiple options for the payment card holder to decline authorization of the attempted transaction, the multiple options comprising a first option for the payment card holder to decline authorization of an undesirable but non-fraudulent transaction, and a second option for the payment card holder to decline authorization of a fraudulent transaction;

receiving a selection of one of the options made by the payment card holder;

when the first option is selected, providing a message to a merchant involved in the attempted transaction to decline the attempted transaction and to return the payment card to an individual attempting the transaction; and when the second option is selected, locking an account associated with the payment card and providing a second message to the merchant involved in the attempted transaction to decline the attempted transaction and to withhold the payment card from the individual attempting the transaction.

\* \* \* \* \*